United States Patent [19]
Holstrom

[11] 4,428,242
[45] Jan. 31, 1984

[54] FLOWMETER USING TWISTING TORQUE

[75] Inventor: John R. Holstrom, Montgomery, Ill.

[73] Assignee: AMSTED Industries Incorporated, Chicago, Ill.

[21] Appl. No.: 357,261

[22] Filed: Mar. 11, 1982

[51] Int. Cl.³ .............................................. G01F 1/28
[52] U.S. Cl. .................................................. 73/861.75
[58] Field of Search ........... 73/861.75, 861.76, 861.74, 73/861.73, 188, 189

[56] References Cited

U.S. PATENT DOCUMENTS

| | | | |
|---|---|---|---|
| 2,805,574 | 9/1957 | Jackson, Jr. et al. | 73/861.74 |
| 3,298,230 | 1/1967 | Stover | 73/861.74 |
| 3,424,000 | 1/1969 | Chelner et al. | 73/861.74 X |
| 4,157,661 | 6/1979 | Schindel | 73/861.73 |

FOREIGN PATENT DOCUMENTS

| | | | |
|---|---|---|---|
| 2614811 | 10/1977 | Fed. Rep. of Germany | 73/863.75 |
| 2476322 | 8/1981 | France | 73/189 |
| 631973 | 11/1949 | United Kingdom | 73/861.74 |
| 919593 | 2/1963 | United Kingdom | 73/861.75 |
| 1419868 | 12/1975 | United Kingdom | 73/861.75 |

*Primary Examiner*—Herbert Goldstein
*Assistant Examiner*—Tom Noland
*Attorney, Agent, or Firm*—Edward J. Brosius; Fred P. Kostka

[57] ABSTRACT

The invention relates to a flow rate measuring device in a liquid flow including a torque detecting member having its longitudinal plane fixedly mounted at an acute angle relative to the direction of liquid flow. Energy from the liquid flow provides a torsional stress on the mounting means. A torque detecting device is provided to detect the torsional stress and converts such measured torque into a flow rate of the liquid flow.

1 Claim, 7 Drawing Figures

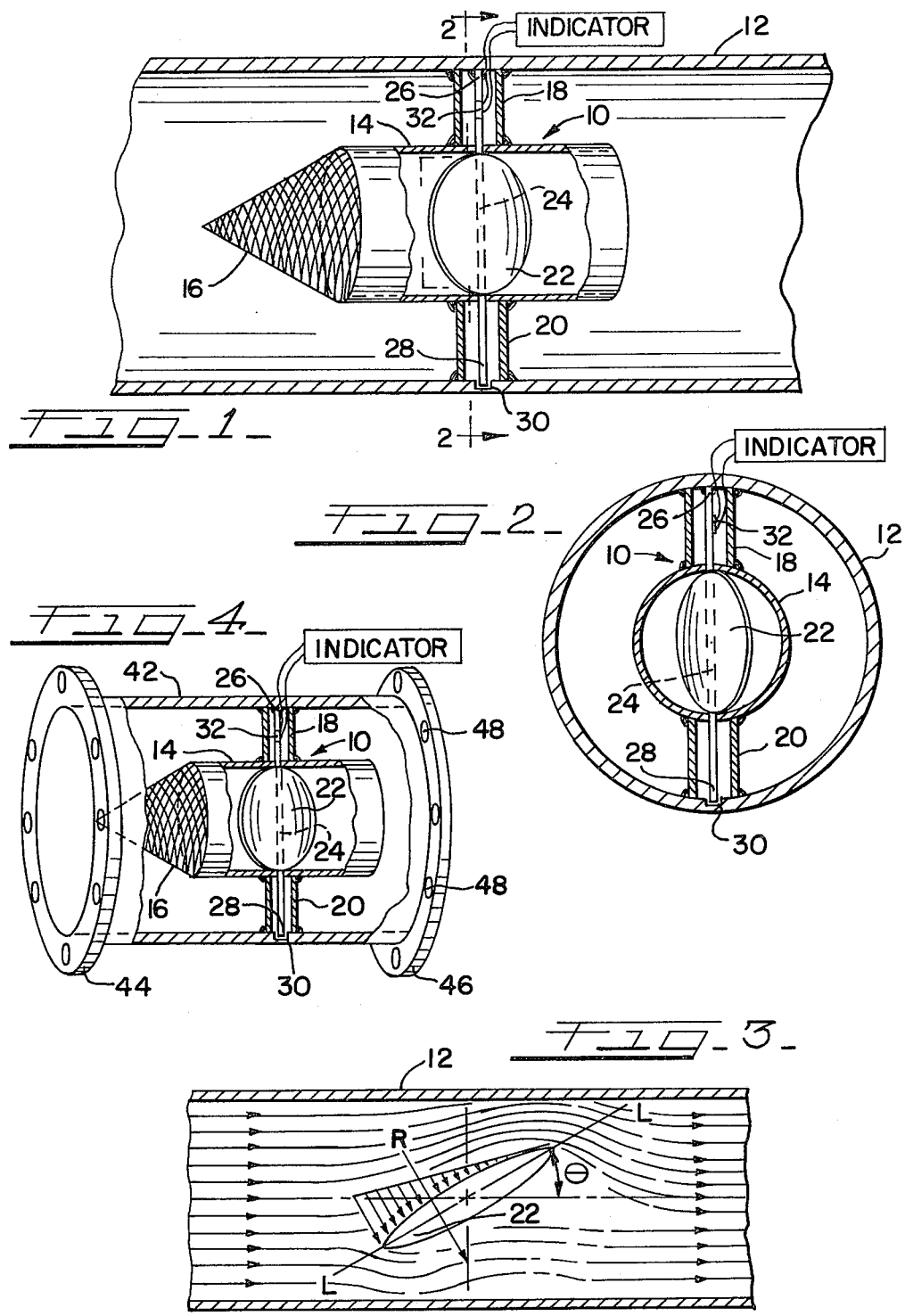

TO INDICATOR

FLOWMETER USING TWISTING TORQUE

BACKGROUND OF THE INVENTION

1. Field of Invention

The present invention relates to a hydraulic flow rate measuring device and more particularly to a flow meter which determines the rate of flow from the amount of torque generated on a member of the device located in the stream of a flowing hydraulic.

2. Prior Art

One known type of flow rate meter is constructed with a suspended and movable target surface exposed to the stream of a flowing liquid. This type of flow rate meter has the disadvantage that during low volume liquid flow, a large percentage of the kinetic energy from the flowing liquid is expended to move the target, thereby rendering an inaccurate reading of the flow rate. Meter constructions sufficiently rugged to handle heavy flow rates, on the other hand, may be lacking in sensitivity to provide an accurate reading of slow liquid flow rates. Furthermore, a movable target exposed to the stream of a flowing liquid is subject to excessive wear so that replacement or maintenance of parts is frequently required. Representative but nonexhaustive of the prior art in the aforementioned type of flow measuring device are U.S. Pat. Nos. 2,600,309 and 3,559,197.

Heretofore, flow rate meters have been constructed as separate units including an open ended cylindrical housing providing fluid passage therethrough and in which the target is mounted to measure the flow rate. These units are inserted in a pipeline to measure the flow therein.

One embodiment of the present invention provides for a slight modification of an existing flow control valve in a pipeline as for example, a butterfly valve so that it serves as a flow rate measuring device and a flow control valve.

SUMMARY OF THE PRESENT INVENTION

By the present invention it is proposed to provide an improved flow rate meter which overcomes the difficulties encountered heretofore.

This is accomplished generally by the provision of a flow rate meter including a plate or target mounted in an open ended cylinder through which the fluid flows. The target is mounted in the path of fluid flow so that a torque is created at the mounting means. The torque created by the different rates of flow is measured and converted to corresponding rates of flow.

In another embodiment of the invention, the flow meter is constructed as a separate unit including an open-ended cylindrical section having flange portions at its ends so that it is capable to mate with an existing pipeline. An open ended cylindrical housing through which the fluid to be measured flows is secured inside the cylindrical section. A target plate is fixedly disposed in the cylindrical housing with its face at an acute angle relative to the direction of fluid flow. A shaft securing said target plate is subjected to a torque moment when the fluid flows around the angularly disposed target plate. The units of torque are then measured and converted by well known mathematical relationships to determine the rates of flow.

In still another embodiment of the invention, an existing valve closure member located in the pipeline through which the fluid flows may be used as the target plate. In this arrangement, the torque created by the valve closure member is measured at the shaft means supporting the valve closure member in the pipeline. The torque measured is translated into the rate of flow by well known mathematical relationships.

DESCRIPTION OF THE DRAWINGS

In the drawings,

FIG. 1 is a fragmentary view of a pipeline showing one embodiment of the flow measuring device of the present invention with parts partially broken away to show underlying details;

FIG. 2 is a longitudinal view of the flow measuring device of FIG. 1 along line 2—2;

FIG. 3 shows a schematic pattern and plan view of a liquid flowing past an angled torque detecting member inside a pipeline resulting in fluidynamic torque;

FIG. 4 is another embodiment of the present invention showing an unitary flow measuring device in a pipe section having flanges at both ends;

DESCRIPTION OF THE PREFERRED EMBODIMENTS

Figure 5:
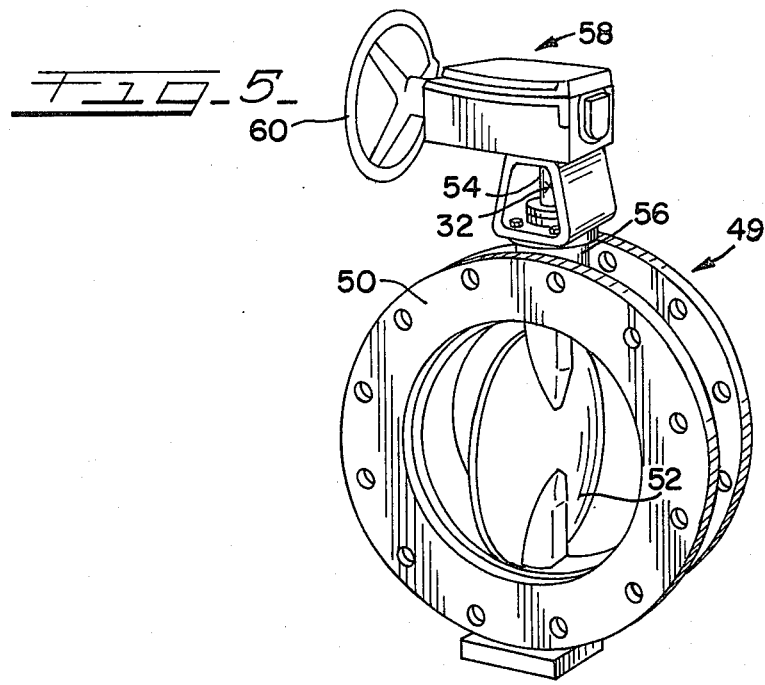
FIG. 5 is a third embodiment of the present invention showing a perspective view of an existing valve utilized as a flow measuring device.

Referring now to FIGS. 1 and 2, there is shown a flow rate measuring device 10 embodying the structure of the invention. The device 10 is located in a pipeline 12 for measuring the rate of fluid flowing therethrough.

The flow rate measuring device 10 comprises generally an open-ended cylindrical housing 14 with its longitudinal axis substantially coaxial with that of pipeline 12. A screen 16, shown here in a cone-shaped structure, is provided at the upstream end of cylinder 14 for deflecting debris or particles which may adversely affect the accuracy of the device. Cylinder 14 is carried by two cylindrical posts 18 and 20 each extending in a direction substantially perpendicular to the longitudinal axis of cylinder 14 and opposite each other. In this arrangement, posts 18 and 20 are shown extending from cylinder 14 in a vertical direction, and it should be apparent that they may extend in other directions. The end portions of posts 18 and 20 closer to the longitudinal axis of cylindrical housing 14, referred herein as inner ends, are fixed to the body of cylinder 14 by welding or similar means. Outer ends of posts 18 and 20 are similarly fixed to the inner surface of pipeline 12 so that cylinder 14 is stationary relative to pipeline 12.

A generally circular, smooth and flat torque detecting member or disc 22 is located inside cylinder 14 and with the face thereof disposed at an acute angle relative to the longitudinal axis of pipeline 12. A shaft 24 or other suitable mounting means, is fixedly secured to the torque detecting member 22. As shown in FIGS. 1 and 2, shaft 24 extends beyond cylinder 14 and inside posts 18 and 20 while shaft 24 is free of contact with posts 18, 20 and cylinder 14. End portion 26 of shaft 24 is secured to the inner surface of pipeline 12 by welding or other suitable means. The other end 28 of shaft 24 is disposed in a recessed opening 30 defined by the inner surface of pipeline 28 so as to allow shaft 24 and member 22 free to rotate. It should be noted that shaft 24 and member 22 secured thereon may be slightly rotatable relative to cylinder 14, depending on the torsional spring rate of the shaft 24. Shaft 24 generally has a high stiffness torsional spring rate so as to minimize rotational movement of member 22.

Figure 6:
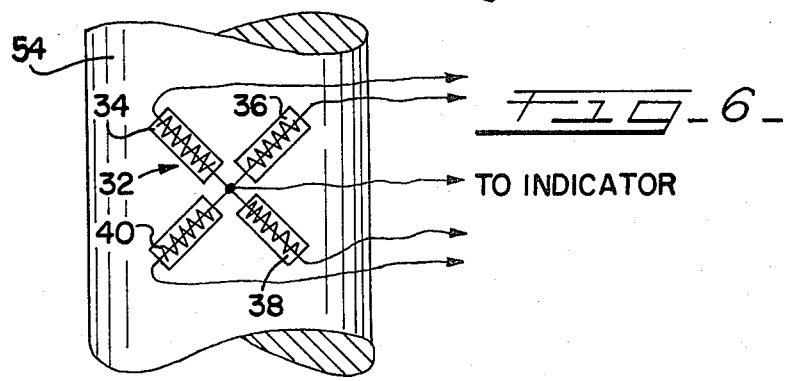
FIG. 6 shows a fragmentary and enlarged view of a disc shaft having torque measuring strain gauges disposed thereon.

A torque measuring device 32 is secured to a portion of shaft 24 adjacent the stationary end 26 for detecting the amount of torque generated by the stream of fluid flowing upon the angularly disposed member 22. As best illustrated in FIG. 6, the torque measuring device 32 comprises four tension/compression strain gauges 34, 36, 38 and 40 arranged in a generally X shaped pattern. Each gauge is arranged with its longitudinal axis at approximately 45 degrees from the longitudinal axis of shaft 24 so that any torsional movement of shaft 24 causes a change in the electrical resistance of any two diagonally opposing gauges. The gauges are affixed to the surface of shaft 24 by an industrial grade adhesive or other suitable securing means. The strain gauges 34, 36, 38 and 40 are connected to well-known circuitry (not shown) that converts the change in mechanical torque into a change in electrical resistance. This change in electrical resistance is amplified by the circuitry that has incorporated mathematical factors derived from well-known physical relationships to be described hereinafter. The circuitry is associated with an indicator that visually displays the measurement in unit of flow rate.

The physical relationship between the torque generated by the target member 22 and the liquid flow rate may be summarized by the following, with reference to FIG. 3 which shows schematically a plan view of an angularly disposed member 22 in a liquid flow inside conduit 12. Member 22 as represented by its longitudinal axis L—L is disposed at an acute angle $\theta$ to the longitudinal axis of conduit 12. The angular disposition of member 22 results in an unequal pressure distribution across the surface of member 22, as demonstrated by the vectors on the upstream surface. A resultant force R of the vectors results in a closing moment about the center of member 22 (a counterclockwise moment in FIG. 3). This moment is commonly known as the fluidynamic torque moment $T_M$.

The torque moment $T_M$ may be expressed by the basic fluidynamic equation:

$$T_M = C_t \times D^3 \times dP \qquad (1)$$

Where
$C_t$ = Coefficient of fluid dynamic torque dimensionless
D = Diameter of disc member-linear consistent measure
dP = Head Loss-Pressure Loss expressed as force per consistent linear measure squared With water as liquid, pressure drop which is a function of flow velocity may be expressed by Bernouilli equation as:

$$dP = \frac{V^2 \times K \times \rho}{2G} \qquad (2)$$

Where
V = Water flow velocity-consistent linear measure per second

K = Resistance coefficient of disc-dimensionless
G = Gravitational constant-consistent linear measure per second$^2$
P = Weight density of fluid-weight per consistent linear measurse cubed Therefore, substituting equation (2) into (1) torque moment may be expressed as:

$$T_M = \frac{C_t \times D^3 \times V^2 \times K \times \rho}{2G} \qquad (3)$$

solving for velocity:

$$V = \sqrt{\frac{2 T_M G}{C_t \times D^3 \times K \times \rho}} \qquad (4)$$

or $$V = K_1 \sqrt{T_M} \qquad (5)$$

Where $$K_1 = \sqrt{\frac{2G}{C_t \times D^3 \times K \times \rho}} \qquad (6)$$

The right hand side of equation (6) can be ascertained when values of variables K and $C_t$ are experimentally determined or obtained from fluidynamic handbooks such as Standard Handbook for Mechanical Engineers by Baumeister and Marks, Published by McGraw-Hill Book Company, New York, New York. For example, a target member of common simple shapes such as circular plate or circular disc disposed at a given angle $\theta$ in relation to the direction of flow. Marks ' handbook provides a specific value for K and $C_t$. G is known gravational constant. Therefore, for a given simple shaped member disposed at a fixed angle $\theta$ from the flow in a given fluid, the value $K_1$ is a numerical constant.

Since $K_1$ is now a known value and signals from strain gauges measuring $T_M$ is imputed to circuitry that takes the square root of such signals, the product of such values provides the right hand side of equation (5), or equally provides an output reading of flow velocity V. Flow rate Q is ascertained by the multiplication of flow velocity V with the cross-sectional area of conduit 12.

In operation, water in pipeline 12 flows through cylinder 14 and passes around member 22 having its face disposed at a predetermined angle from the longitudinal axis of pipeline 12. The fluid kinetic energy provides a fluidynamic torque on the member or disc 22 which tends to rotate the face of member 22 to a position perpendicular to the direction of flow. Member 22 is prevented from closing since shaft 24, to which member 22 is secured, is fixed at one end to pipeline 12. A torsional stress results along the shaft portion between the member 22 and the fixed end 26. Torque measuring device 32 is located along this shaft portion to detect the quantity of torque generated. Such torque quantity obtained from torque measuring device 32 is in the form of an electrical signal. The signal is then fed into a well known circuit (not shown), and converted into units of flow rate in accordance with the above established physical relationship and displayed on an indicator.

FIG. 4 shows a second embodiment of the present invention. Assembly 10 comprises a cylindrical housing 14 supported by posts 18 and 20. A member or disc 22 is disposed with its face at an acute angle relative to the longitudinal axis of cylinder 14. A shaft 24 extends through posts 18 and 20 with member or disc 22 secured thereon. The outer ends of posts 18 and 20 are affixed to the inner wall of a cylindrical section 42. Screen 16 is provided at the upstream end of cylinder 14 in the same configuration as the first embodiment. Cylindrical section 42 is of sufficient length to accommodate the combined length of cylinder 14 and screen 16. The ends of cylindrical section 42 have flange portions 44 and 46 for connection to mating flanges of a pipeline. Openings 48 are provided along flange portions 44 and 46 to receive securing means such as bolts and nuts (not shown).

It should be apparent that the diameter of pipe section 42 may vary depending on the size of pipeline to which it connects. The operation of second embodiment in determining flow rate of the liquid is substantially the same as the operation described in the first embodiment.

Figure 7:
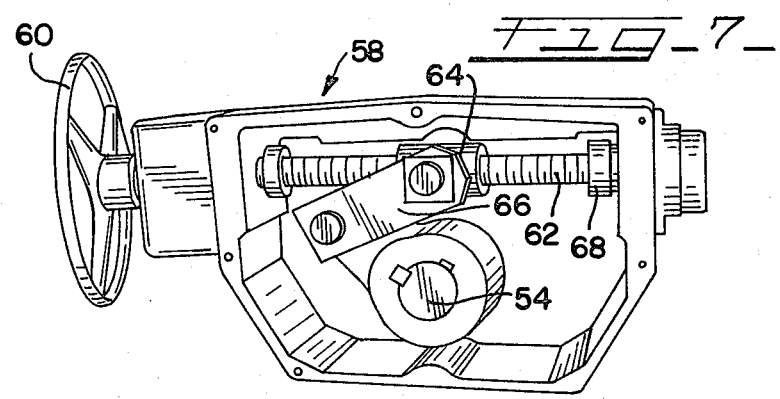
FIG. 7 shows a perspective view of a valve operator with the cover removed, showing the gear stop on the input gear.

FIGS. 5 and 7 show a third embodiment of the present invention, wherein an existing valve is modified to operate as a flow rate measuring device as well as a flow control device. Valve 49 as shown is a butterfly valve constructed with a valve body 50 having a valve disc or valve closure member 52 mounted in the flow passage. Valve disc 52 rotates about a diametrical axis substantially upright relative to the longitudinal axis of the valve body. Valve shaft 54 projects through valve disc 52 along its diametrical axis and having disc 52 secured thereon. Shaft 54 extends beyond valve body 50 and an extension bonnet 56. Extension bonnet 56 is releasably mounted to valve body 50 at one end and an actuating mechanism 58 at the other. Actuating mechanism may include such as a gear operator to actuate the opening or closing of valve disc 52.

FIG. 7 shows one of several actuating mechanism that provides rotational movement of the valve disc 52 in the flow passage. These mechanisms are of various types and may be operated either manually, hydraulically, pneumatically or electrically. FIG. 7 displays a typical manually operated actuator. Handwheel 60 at one longitudinal end of operator 58 allows a worker to turn an input screw 62 fixedly connected thereto. An output traveling nut 64 is in mesh with the threads of input screw 62 which pivotally connects to one end of arm 66. The other end of arm 62 is secured to valve shaft 54. Output traveling nut 64 is in mesh with input screw 62 such that a rotational movement of input screw 62 translates to a linear movement of output traveling nut 64. Arm 66 translates the linear movement of nut 64 to a rotational movement of valve shaft 54. A gear stop 68 of a structure similar to a nut is provided along input screw 62 so as to limit the length of the path of travel of output gear 64.

In FIGS. 5 and 6, torque measuring device 32 of the X-shaped arrangement consisting four strain gauges as described above, is shown affixed to the surface of shaft 54 in the extension bonnet area for the measurement of torque generated by an angularly disposed valve disc 52 in a liquid flow. Torque measuring device 32 provides an electrical signal to a well known circuitry (not shown) which converts units of torque into units of flow rate on an indicator in accordance with the above established physical relationships.

In operation, water in pipeline flows through valve body 50 and around a normally open, angularly disposed valve disc 52. Before each torque measurement, handwheel 60 is turned to a fully opened position. Gear stop 68 provides a stop to output gear 64 at a predetermined position along input screw 62 so as to position disc 52 at a selected acute angle of attack $\theta$ from the longitudinal axis of conduit 12. Disc 52 is prevented from closing in a fluid flow because of its connection with operator 58. A torsional stress results in the shaft portion in the extension bonnet area. Torque measuring device 32 is located in this shaft portion to detect the quantity of torque generated. Such torque quantity obtained from torque measuring device 32 is detected in the form of electrical signal and fed into a well circuitry (not shown). The signal is then converted into units of flow rate in accordance with the above established physical relationship and displayed on an indicator.

What is claimed is:

1. A flow rate measuring device comprising:
   a cylindrical conduit adapted for fluid flow therethrough along longitudinal axis thereof,
   a torque detecting member of a disc shape,
   a rod shaped attachment means fixedly attached to and passing through the center of said torque detecting means,
   said attachment means having one end fixedly attached to said conduit so as to support said torque detecting member in a predetermined acute angle to said longitudinal axis of said conduit,
   strain gauge type torque measuring means affixed to said attachment means and display means operatively connected to said torque measuring means,
   said torque detecting member adapted to transmit directly to said attachment means the force of a fluid flowing through said conduit in the form of a torque,
   said torque measuring means utilizing said torque to transmit a signal to said display means whereby said signal will be converted to a visual display in units of rate of flow of fluid through said conduit.

* * * * *